US012753801B2

(12) United States Patent
Chargui et al.

(10) Patent No.: US 12,753,801 B2
(45) Date of Patent: Oct. 6, 2026

(54) BEARING SEAT ARRANGEMENT

(71) Applicant: PIERBURG PUMP TECHNOLOGY GMBH, Neuss (DE)

(72) Inventors: Jamal Chargui, Neuss (DE); Andreas Karschnia, Neuss (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 57 days.

(21) Appl. No.: 18/715,118

(22) PCT Filed: Dec. 2, 2021

(86) PCT No.: PCT/EP2021/084029
§ 371 (c)(1),
(2) Date: May 31, 2024

(87) PCT Pub. No.: WO2023/099004
PCT Pub. Date: Jun. 8, 2023

(65) Prior Publication Data

US 2025/0035164 A1 Jan. 30, 2025

(51) Int. Cl.
*F16C 35/077* (2006.01)

(52) U.S. Cl.
CPC ........ *F16C 35/077* (2013.01); *F16C 2202/22* (2013.01); *F16C 2226/12* (2013.01); *F16C 2226/40* (2013.01)

(58) Field of Classification Search
CPC ........ F16C 19/06; F16C 35/06; F16C 35/067; F16C 35/07; F16C 35/077; F16C 2202/22; F16C 2226/12; F16C 2226/40
See application file for complete search history.

(56) References Cited

U.S. PATENT DOCUMENTS

| | | | | |
|---|---|---|---|---|
| 4,810,108 | A | 3/1989 | Yajima | |
| 5,735,615 | A | 4/1998 | Pontzer | |
| 2007/0116396 | A1* | 5/2007 | Young | F16C 35/04 384/537 |
| 2010/0303398 | A1 | 12/2010 | Anger et al. | |
| 2017/0159668 | A1 | 6/2017 | Nowitzki et al. | |
| 2017/0234318 | A1* | 8/2017 | Oshikiri | H02K 5/1675 415/206 |
| 2018/0156280 | A1* | 6/2018 | Iizuka | F16C 35/063 |
| 2019/0115799 | A1 | 4/2019 | Horng et al. | |

FOREIGN PATENT DOCUMENTS

| | | | |
|---|---|---|---|
| CN | 105006928 | A | 10/2015 |
| CN | 206341070 | U | 7/2017 |
| DE | 199 18 296 | A1 | 10/2000 |
| DE | 20 2004 013 642 | U1 | 12/2004 |
| EP | 3 470 698 | A1 | 4/2019 |

* cited by examiner

*Primary Examiner* — Alan B Waits
(74) *Attorney, Agent, or Firm* — Norman B. Thot

(57) ABSTRACT

A bearing seat arrangement for an automotive auxiliary device. The bearing seat arrangement includes a static support structure, a separate bearing seat element which is press-fitted into the static support structure so as to provide a press-fitted connection, and an adhesive bond which axially fixes the separate bearing seat element.

9 Claims, 2 Drawing Sheets

BEARING SEAT ARRANGEMENT

CROSS REFERENCE TO PRIOR APPLICATIONS

This application is a U.S. National Phase application under 35 U.S.C. § 371 of International Application No. PCT/EP2021/084029, filed on Dec. 2, 2021. The International Application was published in English on Jun. 8, 2023 as WO 2023/099004 A1 under PCT Article 21(2).

FIELD

The present invention is directed to a bearing seat arrangement for an automotive auxiliary device, in particular to a bearing seat arrangement of a roller bearing seat for a centrifugal fluid pump of a vehicle.

BACKGROUND

Centrifugal pumps are usually used for pumping liquid or gaseous fluids within a fluid circuit of a vehicle. Typical applications of a centrifugal pump stage are water/coolant or oil supply of battery electric vehicles and vehicles with an internal combustion engine, but also the hydrogen supply of fuel cell vehicles.

The heat-load of single pump components or of the complete pump can be extremely high, in particular when using a centrifugal pump for pumping gaseous fluids of higher temperatures. A relatively large thermal expansion can therefore occur at some of the pump components which can affect force-fitted connections, for example, a press-fitted connection between components of different thermal expansion coefficients.

Because of the higher temperature loads, the pump housing is made of a lightweight but metallic material, for example, of an aluminum alloy. Such an aluminum-based material is provided with a relatively low rigidity which requires a reinforcement in some sections with particularly high mechanical loads, for example, in the bearing sections. The bearing seats within the pump housing are accordingly typically reinforced with a high-strength bearing seat element, for example, with a steel sleeve which is press-fitted into the aluminum pump housing. An example for such a reinforced bearing seat is described in CN 206341070 U.

As a result of the different thermal expansion coefficients of the pump housing and the bearing seat element, the thermal expansion of the press fitted bearing seat element can be substantially smaller than the thermal expansion of the pump housing so that the bearing seat element can become loose, resulting in an unwanted axial displacement of the bearing seat element.

A method to reliably fix the bearing seat element even at higher temperatures is described in CN 105006928 A, in which a steel sleeve for reinforcing the bearing section within the housing is described, the steel sleeve being embedded within the pump housing during the molding process of the housing.

The embedding process of the steel sleeve is complex and cost-intensive, in particular because of the relatively precise tolerance requirements for the bearing seat.

SUMMARY

An aspect of the present invention is to provide a bearing seat arrangement for an automotive auxiliary device which provides a relatively cost-efficient, reliable, and rigid bearing seat even at higher operating temperatures.

In an embodiment, the present invention provides a bearing seat arrangement for an automotive auxiliary device. The bearing seat arrangement includes a static support structure, a separate bearing seat element which is press-fitted into the static support structure so as to provide a press-fitted connection, and an adhesive bond which is configured to axially fix the separate bearing seat element.

BRIEF DESCRIPTION OF THE DRAWINGS

The present invention is described in greater detail below on the basis of embodiments and of the drawings in which.

DETAILED DESCRIPTION

Figure 1:
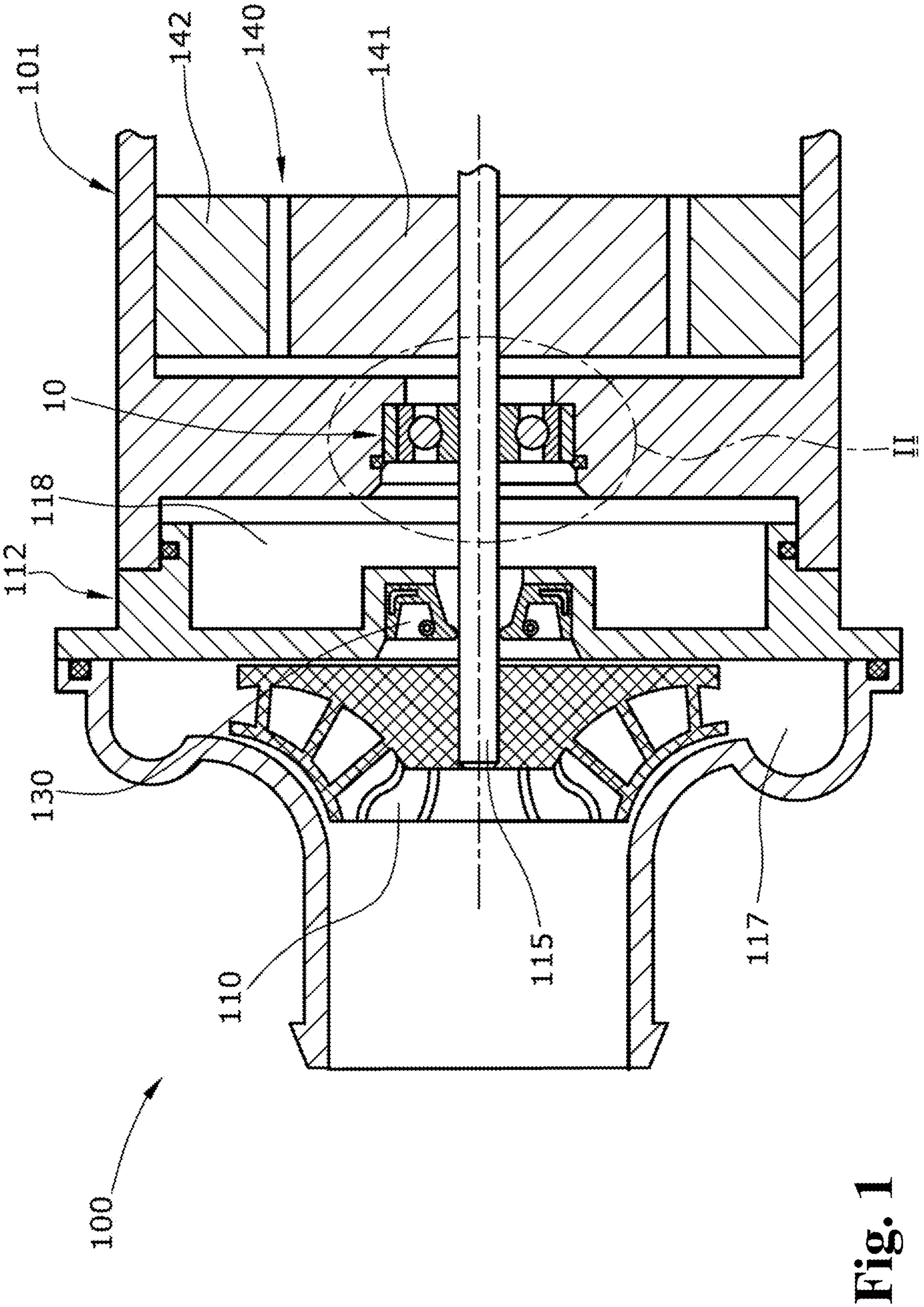
FIG. 1 shows an embodiment of an automotive auxiliary device with a bearing seat arrangement according to the present invention in a schematic longitudinal cross-sectional view.

The bearing seat arrangement for an automotive auxiliary device according to the present invention comprises a static support structure which can, for example, be a housing of an automotive auxiliary device. The static support structure is made of a lightweight material, for example, of an aluminum alloy or any other comparable metallic material with a relatively low weight, for example, a magnesium-based material. However, typical lightweight materials have a relatively low rigidity and a relatively low material strength so that the static support structure requires a reinforcement at the mechanically high loaded sections. An automotive auxiliary device, for example, a pump, typically comprises a drive shaft or an axle, for example, for driving a pump wheel, so that a suitable bearing support within the static support structure is required. The bearing seat arrangement therefore comprises a separate bearing seat element which is press-fitted into the support structure. The bearing seat element can, for example, be a ring-shaped steel sleeve which is press-fitted into a corresponding seat within the support structure, for example, using an interference fit. The support structure is advantageously heat-shrunk onto the steel sleeve to achieve a relatively large interference between the fitted components so that the differences according to the thermal expansion between the support structure and the bearing seat element can be compensated over a relatively large operating temperature range.

If the press-fitted connection fails as a result of a relatively large total thermal expansion difference, the bearing seat element is additionally axially fixed by an adhesive bond that secures the bearing seat element against any dangerous axial displacement. If the force-fitted frictional connection fails, the bearing seat element is therefore still fixed by the bonded connection.

The bearing seat element defines a reinforced bearing seat within the support structure that seats a bearing for supporting, for example, a rotating component within the auxiliary device housing. The bearing can, for example, support a rotating drive shaft of a centrifugal pump, the drive shaft being co-rotatably connected to a centrifugal impeller which rotates within a pump chamber to pump liquid or gaseous fluids within a fluid circuit of a vehicle.

In an embodiment of the present invention, the thermal expansion coefficient can, for example, be larger than the thermal expansion coefficient of the bearing seat element by at least a factor of 1.4. If that factor is larger than 1.4, which is typical for a weight-optimized automotive product, a risk exists that the thermal expansion differences will result in a loosening of the press fitted connection depending on different parameters, in particular on the operating temperature range and on the tightness of the interference fit. In an automotive application, these parameters are typically defined so that an additional axial fixation of the bearing seat element is required if the thermal expansion difference exceeds this factor.

In an embodiment of the present invention, the support structure can, for example, comprise a circumferential adhesive ring groove which is filled with an adhesive bond substance so as to define the adhesive bond. The adhesive bond substance, which can, for example, be a glue or an epoxy adhesive, is therefore concentrated at a defined bonding surface. The circumferential extension of the ring groove, the number of the ring grooves, and the axial overlapping of the ring groove with the radial outside surface of the bearing seat element generally define the bonding surface which defines the strength of the adhesive bond. The larger the bonding surface, the larger the bonding strength. The ring groove can, for example, extend along the complete circumference; the ring groove can alternatively extend along a defined section of the circumference.

In an embodiment of the present invention, the support structure can, for example, comprise more than one ring groove which is axially adjacent to each other so that the total bonding surface of the adhesive bond is increased compared to the single-groove embodiment.

In an embodiment of the present invention, the adhesive bond can, for example, be provided circumferentially at one axial end section of the radial outside surface of the steel sleeve. The adhesive bond is accordingly not provided over the complete radial outside surface of the steel sleeve, but only over a section of the radial outside surface at one axial end of the steel sleeve. The axial forces that act onto the steel sleeve are relatively low. The axial sleeve fixation by the adhesive bond mainly serves to fix the steel sleeve against an axial displacement resulting from vibrations so that a strong adhesive bond over the complete radial outside surface is not necessary.

In an embodiment of the present invention, the adhesive bond substance can, for example, be arranged so that the adhesive bond structure additionally provides a form fit at an axial end surface of the steel sleeve. The adhesive bond substance extends from the radial inner surface of the support structure radially inwards at the axial end of the steel sleeve so that the material accumulation within the bearing seat bore of the support structure additionally secures the steel sleeve in the axial direction. This form fit is thereby functionally similar to an axial stop surface or a retaining ring.

In an embodiment of the present invention, the adhesive ring groove can, for example, be arranged substantially at a transversal plane which is defined by the axial end surface of the steel sleeve, i.e., the axial end surface of the steel sleeve is positioned, as seen in an axial direction, between the two axial sidewalls of the ring groove. The adhesive ring groove can thereby be filled with the adhesive bond substance so that an axial end section of the radial outside surface of the steel sleeve is adhesively bonded and additionally so that the adhesive bond substance extends radially inwards and thereby partially covers the axial end surface of the steel sleeve to define a form fit at the axial end surface of the steel sleeve.

In an embodiment of the present invention, the bearing seat element can, for example, seat a roller bearing ring. The roller bearing ring defining the outer shell of the roller bearing is seated within the bearing seat element which defines a relatively rigid and precise seat for the roller bearing, which is necessary because of the relatively small bearing clearance of a roller bearing. The bearing seat element accordingly even allows the application of a roller bearing.

In an embodiment of the present invention, the adhesive bond can, for example, be provided over an axial length which is less than 20% of the axial length of the bearing seat element. The adhesive bond can, for example, be provided over 10% of the radial outside surface of the bearing seat element so that the adhesive bond is provided only by a relatively small bonding surface which is, however, large enough to axially fix the bearing seat element against any axial displacement resulting from vibrations or similar mechanical effects. Material costs can thereby be kept relatively low.

In an embodiment of the present invention, the auxiliary device can, for example, be a pump or an electric motor. The pump can, for example, be any type of pump which is suitable for pumping liquid or gaseous fluids in a fluid circuit of an automotive application. The pump type can, for example, be a centrifugal pump, for example, for pumping hydrogen as an anode blower in an automotive fuel cell application. The present invention can alternatively be used for any other auxiliary device using an electric motor as drive unit, in particular actuators for any type of automotive valve unit.

An embodiment of the present invention is described below with reference to the enclosed drawings.

Figure 2:
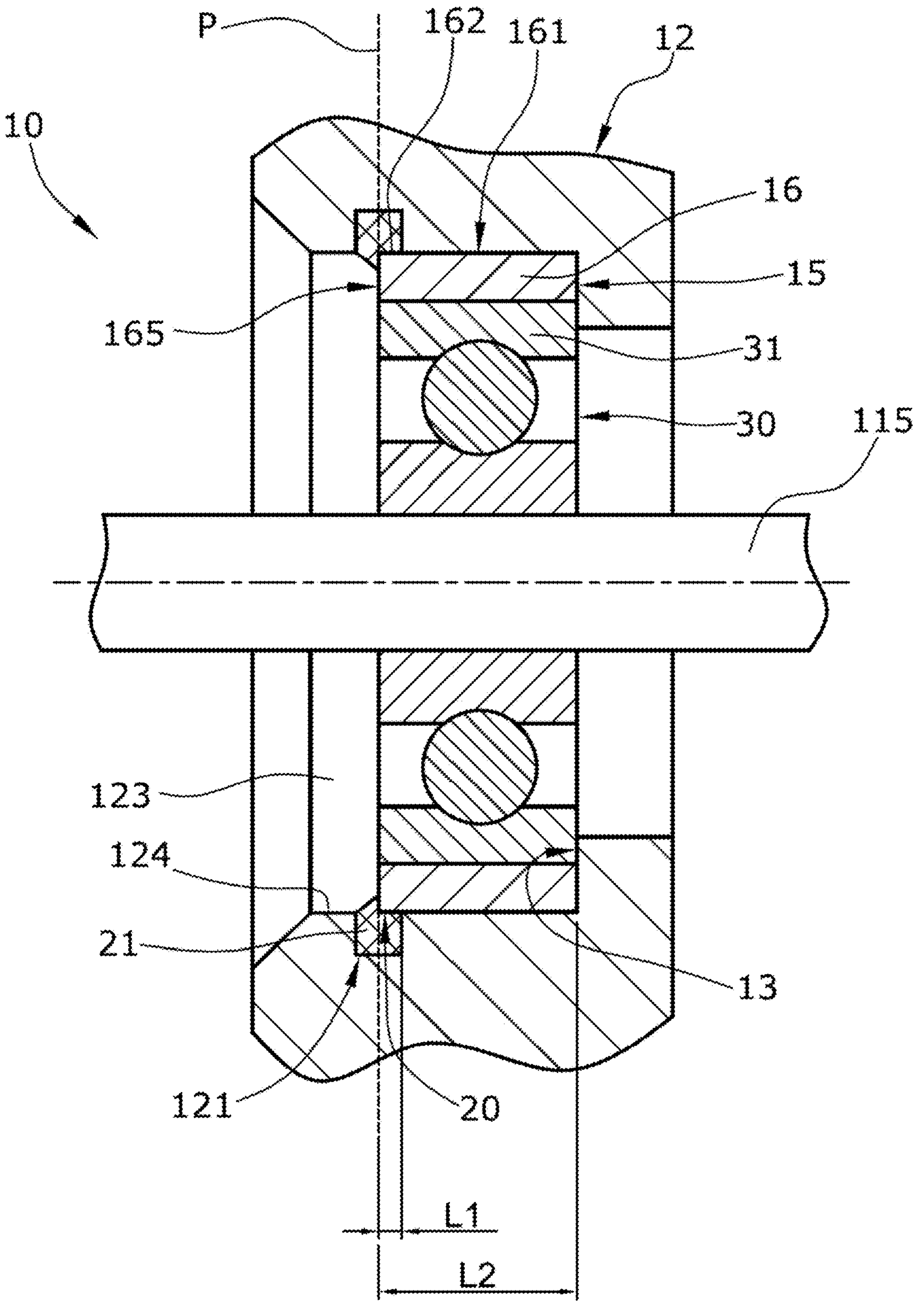
FIG. 2 shows an enlarged and detailed view of the bearing seat arrangement of FIG. 1.

FIG. 1 shows an automotive auxiliary device 100, namely, a centrifugal pump 101 for pumping hydrogen within a hydrogen circuit of a fuel cell application in a vehicle. The automotive auxiliary device 100 comprises a pump housing 112, made of an aluminum-alloy, and a centrifugal impeller 110 which is arranged within a pump chamber 117 and which is co-rotatably connected to a drive shaft 115 which is electrically driven by an electric drive motor 140. The electric drive motor 140 comprises a rotatable motor rotor 141 which is co-rotatably connected to the drive shaft 115 and a motor stator 142 for electromagnetically driving the motor rotor 141. The pump chamber 117 is fluidically separated from a motor chamber 118 by a sealing ring 130. The drive shaft 115 is rotatably supported by a roller bearing 30, wherein the outer roller bearing ring 31 is seated within a bearing seat arrangement 10, which is shown in FIG. 2.

The bearing seat arrangement 10 comprises a static support structure 12 which is, in this embodiment, defined by the aluminum pump housing 112 of the automotive auxiliary device 100. The bearing seat arrangement 10 further comprises a separate bearing seat element 15 which is defined by a ring-shaped steel sleeve 16 which is press-fitted into the support structure 12 using an interference fit. At one axial end, the steel sleeve 16 is axially fixed by an axial stop surface 13 at the support structure 12, the axial stop surface 13 defining an axial stop, in particular during the press-fitting process of the steel sleeve 16. Due to the different thermal expansion coefficients of the materials of the steel sleeve 16 and the aluminum support structure 12, the thermal expansion of the support structure 12 is larger than the thermal expansion of the steel sleeve 16 by a factor of two. The steel sleeve 16 is therefore, at its other axial end, additionally axially fixed by an adhesive bond 20 to prevent an axial displacement of the steel sleeve 16 if the press fitted connection becomes loose as a result of a strong heating of both the steel sleeve 16 and the support structure 12.

The support structure 12 comprises a circumferential adhesive ring groove 121 within the radial inside surface 124 of a bearing seat bore 123 within the support structure 12. The adhesive ring groove 121 is arranged so that it is axially symmetrically arranged to a transversal plane P which is defined by the axial end surface 165 of the steel sleeve 16. The adhesive ring groove 121 is completely filled with an adhesive bond substance 21 which defines the adhesive bond 20. The adhesive bond substance 21 can, for example, be an epoxy adhesive with a temperature resistance up to 150° C., which is typically the maximum operating temperature of the automotive auxiliary device 100.

The adhesive bond substance 21 contacts the radial outside surface 161 of the steel sleeve 16 along the complete circumference at its axial end section facing the adhesive ring groove 121. The adhesive bond substance 21 further contacts the axial end section 162 of the radial outside surface 161 of the steel sleeve 16 in axial direction over an axial length L1 which is about 5% of the axial length L2 of the steel sleeve 16. The adhesive bond substance 21 additionally extends radially inwards with respect to the radial inside surface 124 of the bearing seat bore 123, and thereby covers the axial end surface 165 of the steel sleeve 16 in its edge region so that a form fit is achieved that fixes the steel sleeve 16 axially in addition to the adhesive bond 20 at the radial outside surface 161 of the steel sleeve 16.

The bearing seat arrangement 10 thereby defines a relatively reliable axial fixation of the steel sleeve 16 even at high operating temperatures at which the loosening of the press-fitted connection, as a result of the thermal expansion differences of the steel sleeve 16 and the support structure 12, could otherwise cause an axial displacement of the steel sleeve 16 resulting, for example, from occurring vibrations.

The present invention is not limited to embodiments described herein; reference should be had to the appended claims.

LIST OF REFERENCE CHARACTERS

10 Bearing seat arrangement
12 Support structure
13 Axial stop surface
15 Bearing seat element
16 Steel sleeve
20 Adhesive bond
21 Adhesive bond substance
30 Roller Bearing
31 Outer roller bearing ring
100 Automotive auxiliary device
101 Centrifugal pump
110 Centrifugal impeller
112 Pump housing
115 Drive shaft
117 Pump chamber
118 Motor chamber
121 Adhesive ring groove
123 Bearing seat bore
124 Radial inside surface
130 Sealing ring
140 Electric drive motor
141 Motor rotor
142 Motor stator
161 Radial outside surface
162 Axial end section
165 Axial end surface
L1 Axial length of the contact between the adhesive bond substance 21 and the radial outside surface 161 of the steel sleeve 16
L2 Axial length of steel sleeve 16
P Transversal plane

What is claimed is:

1. A bearing seat arrangement for an automotive auxiliary device, the bearing seat arrangement comprising:
a static support structure;
a separate bearing seat element which is press-fitted into the static support structure so as to provide a press-fitted connection; and
an adhesive bond which is configured to axially fix the separate bearing seat element,
wherein,
the separate bearing seat element is defined by a steel sleeve,
the steel sleeve comprises an axial end surface and a radial outside surface which comprises an axial end section, the radial outside surface defining a maximum radial extent of the steel sleeve so that no portion of the steel sleeve extends radially outward beyond the radial outside surface, and the axial end surface defining an absolute terminal extent of the steel sleeve so that no portion of the steel sleeve extends axially beyond the axial end surface,
the adhesive bond contacts the radial outside surface of the steel sleeve along a complete circumference at the axial end section, and
the adhesive bond extends radially inwards the with respect to the radial outside surface to additionally contact the axial end surface of the steel sleeve.

2. The bearing seat arrangement as recited in claim 1, wherein,
the static support structure has a thermal expansion coefficient,
the separate bearing seat element has a thermal expansion coefficient, and
the thermal expansion coefficient of the static support structure is larger than the thermal expansion coefficient of the separate bearing seat element by a factor of at least 1.4.

3. The bearing seat arrangement as recited in claim 1, wherein the static support structure is made of an aluminum alloy.

4. The bearing seat arrangement as recited in claim 1, wherein,
the static support structure comprises a circumferential adhesive ring groove which is filled with an adhesive bond substance, and
the adhesive bond substance defines the adhesive bond.

5. The bearing seat arrangement as recited in claim 4, wherein the circumferential adhesive ring groove is arranged substantially at a transversal plane which is defined by the axial end surface of the steel sleeve.

6. The bearing seat arrangement as recited in claim 1, wherein the separate bearing seat element is configured to seat a roller bearing ring.

7. The bearing seat arrangement as recited in claim 1, wherein the adhesive bond is provided over an axial length which is less than 20% of an axial length of the separate bearing seat element.

8. The bearing seat arrangement as recited in claim 1, wherein the automotive auxiliary device is a pump or an electric motor.

9. The bearing seat arrangement as recited in claim 1, wherein the press-fitted connection between the separate bearing seat element and the static support structure is provided by an interference fit.

* * * * *